United States Patent Office 2,802,875
Patented Aug. 13, 1957

2,802,875

METHOD FOR PREPARING HYDROXY-METHYL-INDANONES

Donald G. Kundiger, Manhattan, Kans., and Donald D. Wheeler, Midland, Mich., assignors to The Dow Chemical Company, Midland, Mich., a corporation of Delaware No Drawing. Application June 2, 1955,
Serial No. 512,861

8 Claims. (Cl. 260—590)

This invention is concerned with a method for the preparation of 7-hydroxy-2-methyl-1-indanones and is particularly directed to such a method employing a substituted phenyl alphachloroisobutyrate as a starting material.

According to the present invention, it has been discovered that 7-hydroxy-2-methyl-1-indanones, having the formula

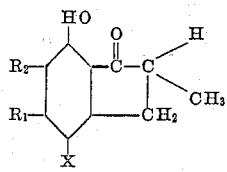

wherein X represents chlorine, bromine or an alkyl radical containing from 1 to 3 carbon atoms, inclusive, $R_1$ represents hydrogen, chlorine or an alkyl radical containing from 1 to 3 carbon atoms, inclusive, and $R_2$ represents hydrogen or an alkyl radical containing from 1 to 3 carbon atoms, inclusive, can be prepared by rearrangement and internal condensation of substituted-phenyl alpha-chloroisobutyrates of the formula

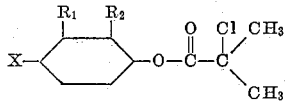

wherein X, $R_1$ and $R_2$ are as above defined.

The desired reaction is accomplished by heating the substituted-phenyl alpha-chloroisobutyrate in the presence of anhydrous aluminum chloride at temperatures within a critical range as will be hereinafter described. It is among the advantages of the invention that the reaction is initiated readily and may be controlled so as to proceed smoothly at relatively low temperatures.

When operating in accordance with the invention, one molar proportion of a substituted-phenyl alpha-chloroisobutyrate, as set forth above, is blended and intimately mixed with at least about two molar proportions of finely divided anhydrous aluminum chloride at a temperature somewhat below the range in which the desired reaction is initiated. Such blending temperature, preferably from about 50° to about 65° C., is chosen sufficiently above the melting point of the particularly chloroisobutyrate employed to avoid the production of a reaction mass too viscous for efficient mixing. In such operation it is generally desirable to heat the chloroisobutyrate reactant in a reaction vessel to the blending temperature and to add the aluminum chloride thereto portionwise with stirring while regulating the temperature of the mixture by heating or cooling as required.

When the above blending operation is complete or substantially complete, the temperature of the mixture of aluminum chloride and chloroisobutyrate is raised to initiate reaction. The reaction temperature is critical to accomplish the production of the desired product in good yield without the production of excessive amounts of undesired organic by-products. The exact temperature at which reaction is initiated varies somewhat depending upon the particular substituents on the benzene ring of the substituted-phenyl alpha-chloroisobutyrate employed. Thus, for example, reaction is initiated at lower temperatures of about 55°–65° C. with alkyl substituents on the ring and at somewhat higher temperatures of about 60° to 70° C. with halogen substituents. In any case, good results have been obtained by heating to initiate the reaction and then maintaining the reaction mixture at temperatures of from about 70° to 85° C. by heating or cooling as required for a period of from about 1 to 3 hours. Thereafter, the mixture may be heated at temperatures of from about 85° to about 105° C. for a period of from about 30 to 90 minutes to complete the reaction.

The reaction proceeds with the evolution of hydrogen chloride and heat and the rate of reaction increases with increasing temperature. Excessive heating during the initial stages of the reaction is to be avoided since at temperatures higher than those set forth above the reaction becomes increasingly violent with attendant danger of explosion or the production of undesired tarry by-products. Thus, for example, it has been observed that initiation of reaction at 100° C. or higher results in a violent and uncontrollable reaction.

In general, the substituted 7-hydroxy-2-methyl-1-indanones are separated from the crude reaction mixture by conventional procedures. Thus, for example, the crude reaction product may be poured into a mixture of ice and a strong mineral acid to decompose anhydrous aluminum chloride and organic aluminum complexes. The desired indanone product is then recovered by the separation of the immiscible organic from the aqueous layers and extraction of the latter with a water-immiscible solvent such as benzene or ether. The organic layer and extract are then combined and subjected to fractional distillation.

In a preferred procedure, the crude indanone product, after the elimination of aluminum compounds and recovery of the extraction solvent, is dissolved in alcohol and treated with an aqueous solution of cupric acetate to produce the copper chelate compound of the indanone as an insoluble precipitate. The copper chelate compound is separated by filtration and purified by washing. The free indanone is then recovered by reacting the copper chelate compound with an aqueous solution of a strong mineral acid such as hydrochloric or sulfuric acid followed by extraction of the indanone with a water-immiscible organic solvent and fractional distillation of the resulting extract. The copper chelate compounds of the substituted 7-hydroxy-2-methyl-1-indanones are described and claimed as new chemical compounds in our copending application Serial No. 512,862, filed concurrently herewith.

The (substituted-phenyl) alpha-chloroisobutyrates employed as starting materials in the method of the present invention may be prepared by reacting suitable substituted phenols with alpha-chloroisobutyryl chloride in the presence of a catalytic amount of anhydrous aluminum chloride in accordance with the method set forth in a copending application, Serial No. 334,733, filed February 2, 1953, and now abandoned.

In a further preferred embodiment of the present invention, the crude reaction product obtained in accordance with the method of said application, Serial No. 334,733, is employed directly as a starting material for the present method without isolation of the substituted-phenyl alpha-chloroisobutyrate. In such mode of operation, said crude butyrate reaction product is adjusted to a temperature of 50°–65° C. and blended with sufficient anhydrous aluminum chloride to provide at least about 2 moles of aluminum chloride per mole of chloroisobutyrate, taking into account the aluminum chloride already present as a catalyst for the preparation of the chloroisobutyrate. Thereafter, the reaction is initiated and completed as set forth above.

The substituted 7-hydroxy-2-methyl-1-indanones, prepared in accordance with the present invention, have been found useful as fungicides. For example, 25 parts of 4-chloro-7-hydroxy-2-methyl-1-indanone is ground with 2 parts of wetting and dispersing agents and 73 parts of clay to prepare a wettable powder and the latter dispersed in water to prepare an aqueous spray composition containing 3 pounds of the indanone compound per 100 gallons of finished spray. The spray composition when applied to young tomato plants provides substantially complete control of the growth of spores of tomato early blight (*Alternaria solani*).

The following examples illustrate the invention, but are not to be construed as limiting the same.

*Example 1*

323.4 grams (1.4 moles) of p-chlorophenyl alpha-chloroisobutyrate (boiling at 77.5°–78° C. under 0.3 millimeter pressure and having a refractive index ($n$/D) of 1.514 at 20° C.) was heated to a temperature of 55°–65° C. and 368 grams (2.8 moles) of finely divided anhydrous aluminum chloride added thereto portionwise with stirring. During the addition of aluminum chloride, the mixture was maintained in the above temperature range and on completion of the addition was then heated to a temperature of 70° C. At the latter temperature an exothermic reaction was initiated with the evolution of hydrogen chloride gas. The reaction mixture was externally cooled and maintained at about 70° C. for two hours, regulated to a temperature of 70°–85° C. for a further hour, and finally heated at temperatures up to about 105° C. for 30 minutes to complete the reaction. The crude reaction product was poured into a mixture of 2240 grams of crushed ice and 224 milliliters of concentrated hydrochloric acid. The resulting mixture separated into an aqueous layer and an organic layer. The latter was separated and the aqueous layer successively extracted with several portions of benzene to provide about 900 milliliters of extract. The organic layer and benzene extract were combined and fractionally distilled at atmospheric pressure to recover benzene, and thereafter under reduced pressure to separate the desired 4-chloro-7-hydroxy-2-methyl-1-indanone product boiling at 84°–94° C. under 0.3–0.7 millimeter pressure and having a melting point of 38°–40° C.

*Example 2*

53.1 grams (0.25 mole) of p-tolyl alpha-chloroisobutyrate (boiling at 69°–69.5° C. under 0.2 millimeter pressure and having a refractive index ($n$/D) of 1.5000 at 20° C.) and 66.7 grams (0.5 mole) of finely divided anhydrous aluminum chloride were mixed together according to the procedure of Example 1. The resulting mixture was heated to 70° C. to initiate the reaction and maintained at temperatures of from 70° to 85° C. for a period of 1.5 hours to complete the reaction. The crude reaction product was poured into a mixture of 400 grams of crushed ice and 40 milliliters of hydrochloric acid and the resulting mixture worked up by the procedure of Example 1, employing about 300 milliliters of benzene in the extractions. The fractional distillation yielded 23.1 grams of 2,4-dimethyl-7-hydroxy-1-indanone product boiling at 75°–90° C. under 0.3 millimeter pressure and having a melting point of 47.5°–49.0° C. In addition to the above, 10.7 grams of p-cresol was recovered as a by-product.

*Example 3*

295 grams (1.3 moles) of 3,4-dimethylphenyl alpha-chloroisobutyrate (boiling at 91.5° C. under 0.2 millimeter pressure and having a refractive index ($n$/D) of 1.5051 at 20° C.) was heated to a temperature of 55°–60° C. and 347 grams (2.6 moles) of finely crushed anhydrous aluminum chloride added thereto portionwise with stirring. The reaction mixture was heated to 60° C. to initiate the reaction and maintained at temperatures from 60°–66° C. for one hour and thereafter at gradually increasing temperatures up to 75° C. for a period of 15 minutes to complete the reaction. The crude reaction product was poured with stirring into a mixture of 2080 grams of crushed ice and 208 milliliters of concentrated hydrochloric acid. The resulting mixture was separated and the aqueous layer extracted as in the preceding examples employing about 600 milliliters of benzene for the extractions. The organic layer and benzene extract were combined and fractionally distilled at atmospheric pressure to recover benzene. The oily organic residue from the distillation was dissolved in 1,500 milliliters of hot ethyl alcohol and the resulting solution mixed with a solution of 100 grams of cupric acetate in 1,000 milliliters of hot water to produce the copper chelate compound of 7-hydroxy-2,4,5-trimethyl-1-indanone as a precipitate. The resulting mixture was cooled to room temperature and the precipitate separated by filtration and successively washed with water, alcohol and acetone. The washed precipitate was air-dried at room temperature to obtain 191 grams of the copper chelate compound, melting at 215°–219° C.

141 grams of the above copper chelate compound was treated with 700 milliliters of aqueous hydrochloric acid of approximately 20 percent by weight concentration. The resulting mixture was extracted with several portions of benzene. The benzene extracts were combined and fractionally distilled to recover benzene and obtain as a residue 112 grams of 7-hydroxy-2,4,5-trimethyl-1-indanone as a crystalline solid, melting at 76°–78° C.

*Example 4*

50 grams (0.22 mole) of 2,4-dimethylphenyl alpha-chloroisobutyrate (boiling at 79.5° C. at 0.3 millimeter pressure and having a refractive index ($n$/D) of 1.5020 at 20° C.) is heated to 50° C. and 59 grams (0.44 mole) of finely divided anhydrous aluminum chloride added thereto portionwise with stirring. The reaction mixture is then heated to 55° C. to initiate reaction and maintained at temperatures of from 55° to 65° C. for 1 hour and then at gradually increasing temperatures up to 100° C. for 45 minutes. The crude reaction product is poured into a mixture of 350 grams of crushed ice and 35 milliliters of concentrated hydrochloric acid and the resulting mixture worked up according to the procedure of Example 1, employing about 200 milliliters of benzene in the extraction step. The fractional distillation yields the desired 7-hydroxy-2,4,6-trimethyl-1-indanone boiling at 94.5°–95° C. under a pressure of 0.2 millimeter and having a refractive index ($n$/D) of 1.5595 at 20° C.

*Example 5*

83.2 grams (0.3 mole) of p-bromophenyl alpha-chloroisobutyrate (having a melting point of 37°–38° C.) and 80 grams (0.6 mole) of anhydrous aluminum chloride were mixed together by the procedure of Example 1 and the mixture heated to 68° C. to initiate reaction. Thereafter the reaction mixture was maintained at gradually increasing temperatures of from 70° to 85° C. for 1.5 hours and then at about 90°–100° C. for 30 minutes to complete the reaction. The crude reaction product was cooled somewhat and poured into a mixture of 480 grams of crushed ice and 48 milliliters of concentrated hydrochloric acid. The resulting mixture was worked up according to the procedure of Example 1 using about 200 milliliters of benzene for the extractions. The fractional distillation yielded a 4-bromo-7-hydroxy-2-methyl-1-indanone product which crystallized on standing to a solid having a melting point of 49°–51° C.

Example 6

226.5 grams (1 mole) of p-ethylphenol is heated to 50° C. and 26.7 grams (0.2 mole) of powdered anhydrous aluminum chloride added thereto portionwise with stirring. The resulting mixture is heated to 60°–70° C. and 141 grams (1 mole) of alpha-chloroisobutyryl chloride added portionwise with stirring over a period of one hour while maintaining the mixture at a temperature within the latter range. Reaction, as evidenced by the evolution of hydrogen chloride, is initiated rapidly when the chloroisobutyryl chloride is mixed with the other reactants. After addition of all the alpha-chloroisobutyryl chloride the reaction mixture is heated at temperatures of from 70° to 80° C. for about 1.5 hours to complete the reaction and produce a p-ethylphenyl alpha-chloroisobutyrate product.

The crude reaction product from the above operation is cooled to 55° C. and 240 grams (1.8 moles) of fine crystalline anhydrous aluminum chloride added thereto with stirring. The resulting mixture is heated to 65° C. to initiate reaction and thereafter maintained at gradually increasing temperatures of from about 70° to 85° C. for about 2 hours to complete the reaction. The reaction mixture is poured into a mixture of 1600 grams of crushed ice and 160 milliliters of concentrated hydrochloric acid. The resulting mixture is separated into an organic layer and an aqueous layer and the latter is successively extracted with three 100 milliliters portions of benzene. The benzene extracts and organic layer are combined and fractionally distilled at atmospheric pressure to recover benzene and then at reduced pressure to recover by-product p-ethylphenol and to obtain the desired 4-ethyl-7-hydroxy-2-methyl-1-indanone product as a crystalline solid.

Example 7

Following the procedure of Example 1, one mole of p-isopropylphenyl alpha-chloroisobutyrate is mixed with 2 moles of anhydrous aluminum chloride and the mixture heated at temperatures of from 70° to 85° C. for 2 hours. The reaction mixture is worked up as in the preceding examples to obtain a 4-isopropyl-7-hydroxy-2-methyl-1-indanone product as a crystalline solid.

We claim:

1. A method for the preparation of substituted 7-hydroxy-2-methyl-1-indanones which comprises blending one molar proportion of a substituted-phenyl alpha-chloroisobutyrate of the formula

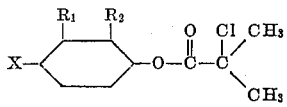

wherein X represents a member of the group consisting of chlorine, bromine and alkyl radicals containing from 1 to 3 carbon atoms, inclusive, R₁ represents a member of the group consisting of hydrogen, chlorine and alkyl radicals containing from 1 to 3 carbon atoms, inclusive, and R₂ represents a member of the group consisting of hydrogen and alkyl radicals containing from 1 to 3 carbon atoms, inclusive, at a temperature of from about 50° to 65° C. and below the reaction temperature, with at least about 2 molar proportions of finely divided anhydrous aluminum chloride, heating the resulting mixture to a reaction temperature in the range of from about 55° to about 70° C. and thereafter maintaining the reaction mixture at a temperature of from about 70° to 85° to accomplish the desired reaction.

2. A method for the preparation of substituted 7-hydroxy-2-methyl-1-indanones which comprises blending one molar proportion of a substituted-phenyl alpha-chloroisobutyrate of the formula

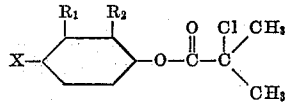

wherein X represents a member of the group consisting of chlorine, bromine and alkyl radicals containing from 1 to 3 carbon atoms, inclusive, R₁ represents a member of the group consisting of hydrogen, chlorine and alkyl radicals containing from 1 to 3 carbon atoms, inclusive, and R₂ represents a member of the group consisting of hydrogen and alkyl radicals containing from 1 to 3 carbon atoms, inclusive, at a temperature of from about 50° to 65° C. and below the reaction temperature, with at least about 2 molar proportions of anhydrous aluminum chloride, heating the resulting mixture to a reaction temperature in the range of from about 55° to about 70° C. and thereafter regulating the temperature of the reaction mixture at gradually increasing temperatures up to from about 85° to 105° C. to accomplish the desired reaction.

3. A method according to claim 2 wherein the crude indanone product is separated from aluminum chloride and organic aluminum complexes, dissolved in a water-miscible alcohol and precipitated in the form of a copper chelate compound by reaction with a solution of a cupric salt, and the desired substituted 7-hydroxy-2-methyl-1-indanone is thereafter recovered in purified form by reaction of said copper chelate compound with a strong mineral acid.

4. A method for the preparation of 4-chloro-7-hydroxy-2-methyl-1-indanone which comprises blending one molar proportion of a p-chlorophenyl alpha-chloroisobutyrate at a temperature of from about 50° to 65° C. with at least about 2 molar proportions of anhydrous aluminum chloride, heating the resulting mixture to a reaction temperature in the range of from about 55° to about 70° C. and thereafter regulating the temperature of the reaction mixture at gradually increasing temperatures up to from about 85° to 105° C. to accomplish the desired reaction.

5. A method for the preparation of 2,4-dimethyl-7-hydroxy-1-indanone which comprises blending one molar proportion of p-tolyl alpha-chloroisobutyrate at a temperature of from about 50° to 65° C. with at least about 2 molar proportions of anhydrous aluminum chloride, heating the resulting mixture to a reaction temperature in the range of from about 55° to about 70° C. and thereafter regulating the temperature of the reaction mixture at gradually increasing temperatures up to from about 85° to 105° C. to accomplish the desired reaction.

6. A method for the preparation of 2,4,5-trimethyl-7-hydroxy-1-indanone which comprises blending one molar proportion of 3,4-dimethylphenyl alpha-chloroisobutyrate at a temperature of from about 50° to 65° C. with at least about 2 molar proportions of anhydrous aluminum chloride, heating the resulting mixture to a reaction temperature in the range of from about 55° to about 70° C. and thereafter regulating the temperature of the reaction mixture at gradually increasing temperatures up to from about 85° to 105° C. to accomplish the desired reaction.

7. A method for the preparation of 2,4,6-trimethyl-7-hydroxy-1-indanone which comprises blending one molar proportion of 2,4-dimethylphenyl alpha-chloroisobutyrate at a temperature of from about 50° to 65° C. with at least about 2 molar proportions of anhydrous aluminum chloride, heating the resulting mixture to a reaction temperature in the range of from about 55° to about 70° C. and thereafter regulating the temperature of the reaction mixture at gradually increasing temperatures up to from about 85° to 105° C. to accomplish the desired reaction.

8. A method for the preparation of substituted-7-hydroxy-2-methyl-1-indanones which comprises producing as a crude reaction product a substituted phenyl alpha-chloro-isobutyrate of the formula

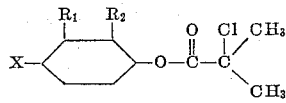

wherein X represents a member of the group consisting of chlorine, bromine and alkyl radicals containing from 1 to 3 carbon atoms, inclusive, $R_1$ represents a member of the group consisting of hydrogen, chlorine and alkyl radicals containing from 1 to 3 carbon atoms, inclusive, and $R_2$ represents a member of the group consisting of hydrogen and alkyl radicals containing from 1 to 3 carbon atoms, inclusive, by the reaction of the corresponding phenol with alpha-chloroisobutyryl chloride in the presence of a catalytic amount of anhydrous aluminum chloride, adjusting the temperature of said crude reaction product to from about 50° to 65° C. and blending therewith sufficient anhydrous aluminum chloride to provide a total of at least about 2 moles of aluminum chloride per mole of alpha-chloroisobutyrate in the mixture, heating the resulting mixture to a reaction temperature in the range of from about 55° to about 70° C. and thereafter regulating the temperature of the reaction mixture at gradually increasing temperatures up to from about 85° to 105° C. to accomplish the desired reaction.

References Cited in the file of this patent

Thomas: "Anhydrous Aluminum Chloride in Organic Chemistry," Reinhold (1941), pp. 358–9.
Barnes et al.: J. Am. Chem. Soc. 71, 3523–3528 (1949).
Fieser and Fieser: "Organic Chemistry," 2nd. Ed., D. C. Heath & Co. (1950), pp. 676–7.